United States Patent
Kilchyk et al.

(10) Patent No.: US 11,970,951 B1
(45) Date of Patent: Apr. 30, 2024

(54) METAL PLATED ADDITIVELY MANUFACTURED PLASTIC ROTORS AND THEIR METHOD OF MANUFACTURING

(71) Applicant: Hamilton Sundstrand Corporation, Charlotte, NC (US)

(72) Inventors: Viktor Kilchyk, Lancaster, NY (US); Brent J. Merritt, Southwick, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/104,574

(22) Filed: Feb. 1, 2023

(51) Int. Cl.
| | |
|---|---|
| *F01D 5/02* | (2006.01) |
| *B29C 64/10* | (2017.01) |
| *B29K 305/00* | (2006.01) |
| *B29L 31/00* | (2006.01) |

(Continued)

(52) U.S. Cl.
CPC ............... *F01D 5/02* (2013.01); *B29C 64/10* (2017.08); *B33Y 10/00* (2014.12); *B33Y 80/00* (2014.12); *B29K 2305/00* (2013.01); *B29L 2031/7498* (2013.01); *F05D 2230/30* (2013.01); *F05D 2230/60* (2013.01); *F05D 2300/10* (2013.01); *F05D 2300/43* (2013.01);

(Continued)

(58) Field of Classification Search
CPC ..... F01D 5/02; F01D 5/12; F01D 5/28; F01D 25/005; F04D 29/18; F04D 29/26; F04D 29/28; F05D 2300/10; F05D 2300/43; F05D 2300/50212; F05D 2300/6031; F05D 2300/6034
See application file for complete search history.

(56) References Cited

U.S. PATENT DOCUMENTS

| | | | |
|---|---|---|---|
| 9,427,835 | B2 | 8/2016 | Cheung et al. |
| 9,777,593 | B2 | 10/2017 | Kirkpatrick et al. |
| 9,920,429 | B2 | 3/2018 | Carlsten et al. |

(Continued)

FOREIGN PATENT DOCUMENTS

| | | |
|---|---|---|
| CN | 101600817 A | 12/2009 |
| DE | 102007048852 B4 | 2/2016 |
| RU | 2611137 C1 | 2/2017 |

OTHER PUBLICATIONS

'Plastic Thermal Expansion—Thermal Expansion of Engineering Thermoplastics'. AZOM [online]. 2020, [retrieved on Oct. 20, 2023]. Retrieved from the Internet: <URL:https://www.azom.com/suppliers.aspx?SupplierID=1356> (Year: 2020).*

(Continued)

*Primary Examiner* — Elton K Wong
(74) *Attorney, Agent, or Firm* — Kinney & Lange, P.A.

(57) ABSTRACT

A rotor for use in a turbomachine includes a hub centered on a central axis and having a disk portion and a shaft portion and a blade extending outward from the hub. The hub and the blade together include a plastic substrate and metal plating disposed on at least apportion of an outer surface of the plastic substrate. The plastic substrate has a matrix material and fibers embedded in the matrix material. The fibers have a first coefficient of thermal expansion. The metal plating has a second coefficient of thermal expansion. The fibers are selected such that a bulk coefficient of thermal expansion of the plastic substrate at the outer surface of the plastic substrate substantially matches the second coefficient of thermal expansion of the metal plating.

17 Claims, 4 Drawing Sheets

(51) Int. Cl.
 B33Y 10/00 (2015.01)
 B33Y 80/00 (2015.01)
(52) U.S. Cl.
 CPC .............. F05D 2300/50212 (2013.01); F05D 2300/6031 (2013.01); F05D 2300/6034 (2013.01)

(56) References Cited

U.S. PATENT DOCUMENTS

| | | | |
|---|---|---|---|
| 10,677,090 | B2 | 6/2020 | Sakala et al. |
| 10,927,843 | B2 | 2/2021 | Roach et al. |
| 2013/0001321 | A1 | 1/2013 | Pelletier et al. |
| 2013/0260130 | A1 | 10/2013 | Taxacher et al. |
| 2016/0160353 | A1 | 6/2016 | Miarecki et al. |
| 2016/0160869 | A1* | 6/2016 | Roach ................ C23C 18/1653 416/189 |
| 2016/0167791 | A1 | 6/2016 | Roach et al. |
| 2020/0018260 | A1 | 1/2020 | Garcia et al. |
| 2021/0054852 | A1* | 2/2021 | Verma ..................... B33Y 80/00 |
| 2022/0145768 | A1* | 5/2022 | Angel ................... F01D 25/265 |
| 2023/0193047 | A1* | 6/2023 | Gettings ................... B05D 3/12 106/14.05 |
| 2023/0235672 | A1* | 7/2023 | Albers .................. F01D 25/243 416/144 |

OTHER PUBLICATIONS

'Fiberglass Fabrics & Composites'. JPS [online]. 2022, [retrieved on Oct. 20, 2023]. Retrieved from the Internet: <URL:https://jpscm.com/why-fiberglass/> (Year: 2022).*

'Thermal Expansion of Metals'. The Engineering ToolBox [online]. 2020, [retrieved on Oct. 20, 2023]. Retrieved from the Internet: <URL:https://www.engineeringtoolbox.com/thermal-expansion-metals-d_859.html> (Year: 2020).*

"The Best of Both Worlds: A New Take on Metal-Plastic Hybrid 3D Printing", Waseda University, Oct. 5, 2020 [online], [retrieved on Feb. 27, 2023]. Retrieved from the Internet <URL: https://www.sciencedaily.com/releases/2020/10/201005101542.htm>.

A. Freier, "New 3D Printing Technique Allows for Better Control of Composite Material Fiber Orientation" Jan. 16, 2018 [online] [retrieved Feb. 27, 2023] <URL:https://all3dp.com/new-3d-printing-technique-allows-better-control-composite-material-fiber-orientation/>.

A. Pearson, et al., "Novel polyurethane elastomeric composites reinforced with alumina, aramid . . . " from Composite Part B: Engineering, vol. 122, Aug. 1, 2017, 6 pages <https://doi.org/10.1016/j.compositesb.2017.04.017>.

B. Coxworth. "Hybrid 3D printing tech produces plastic-metal items" New Atlas, Oct. 6, 2020 [online], [retrieved on Feb. 27, 2023]. Retrieved from the Internet <URL: https://newatlas.com/3d-printing/hybrid-3d-printing-plastic-metal-items/>.

G. Gardiner, "Magnetic 3D Printing the next generation of tailored composites", Jul. 26, 2019 [online], [retrieved on Feb. 27, 2023]. Retrieved from <URL:https://www.compositesworld.com/articles/magnetic-3d-printing-the-next-generation-of-tailored-composites>.

N. Giani, et al., "Towards sustainability in 3D printing of thermoplastic composites: Evaluation of recycled carbon fibers . . . ", from Composites Part A: Applied Sci & Mfg, vol. 159, Aug. 2022, 6 pages <https://doi.org/10.1016/j.compositesa.2022.107002>.

The Best of Both Worlds: A New Take on Metal-Plastic Hybrid 3D Printing, Waseda University, Oct. 5, 2020 [online], [retrieved on Feb. 27, 2023]. Retrieved from the Internet <URL: https://www.waseda.jp/top/en/news/73810>.

* cited by examiner

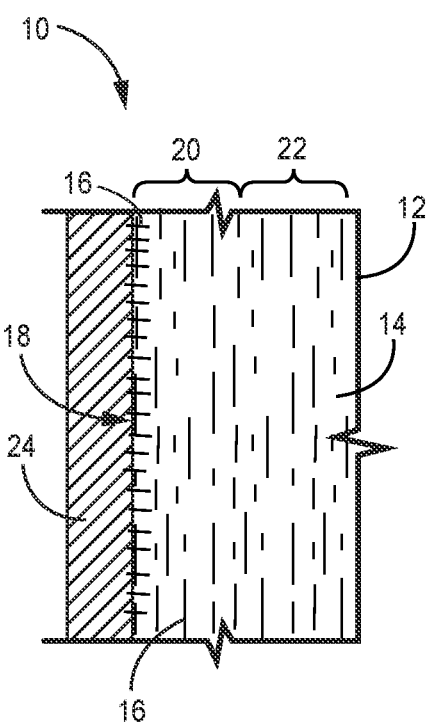
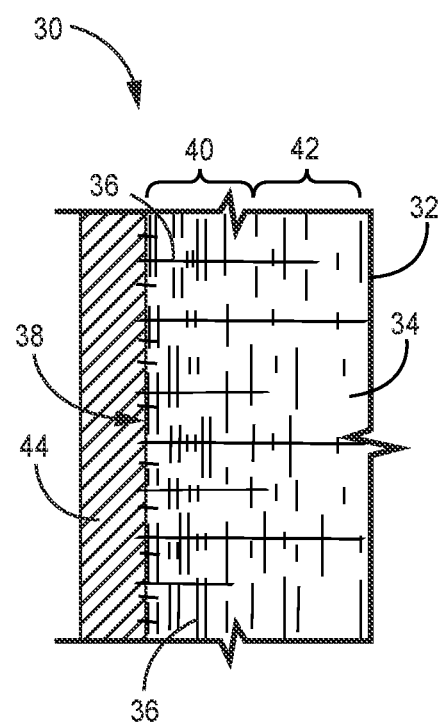
FIG. 1
FIG. 2

METAL PLATED ADDITIVELY MANUFACTURED PLASTIC ROTORS AND THEIR METHOD OF MANUFACTURING

BACKGROUND

The present disclosure relates generally to aviation components and, more particularly, to metal-plated plastic rotors.

Metal-plated plastic aviation components have been developed as a lightweight, high-strength, alternative to metal components. Metal-plated plastic components include a plastic or plastic substrate coated with a metal plating on an outer surface. The metal plating increases the strength and abrasion resistance of the component. Metal-plated plastic components have been particularly attractive for use in gas turbine engine applications, where they can provide overall weight reduction of the engine to improve engine efficiency and provide fuel cost savings.

Limitations in use of metal-plated plastic components include poor adhesion between the metal plating and the plastic substrate, which reduces long-term component durability. Various methods of manufacture and mechanical locking features have been developed to improve an interfacial bond strength between the metal plating the plastic at variable temperatures, as separation of the metal plating can occur.

SUMMARY

In one aspect, a rotor for a turbomachine includes a hub centered on a central axis and having a disk portion and a shaft portion and a blade extending outward from the hub. The hub and the blade together include a plastic substrate and metal plating disposed on at least apportion of an outer surface of the plastic substrate. The plastic substrate has a matrix material and fibers embedded in the matrix material. The fibers have a first coefficient of thermal expansion. The metal plating has a second coefficient of thermal expansion. The fibers are selected such that a bulk coefficient of thermal expansion of the plastic substrate at the outer surface of the plastic substrate substantially matches the second coefficient of thermal expansion of the metal plating.

In another aspect, a method of forming a rotor for a turbomachine includes forming, by an additive manufacturing process, a plastic substrate having an outer surface, impregnating, by the additive manufacturing process, the plastic substrate with fibers having a first coefficient of thermal expansion, and applying a metal plating to the outer surface of the plastic substrate. The metal plating has a second coefficient of thermal expansion and the fibers are selected such that a bulk coefficient of thermal expansion of the plastic substrate at the outer surface of the plastic substrate substantially matches the second coefficient of thermal expansion of the metal plating.

The present summary is provided only by way of example, and not limitation. Other aspects of the present disclosure will be appreciated in view of the entirety of the present disclosure, including the entire text, claims and accompanying figures.

BRIEF DESCRIPTION OF THE DRAWINGS

FIG. 1 is a simplified cross-sectional view of a portion of a metal-plated component.

FIG. 2 is a simplified cross-sectional view of a portion of another embodiment of a metal-plated component.

Figure 3:
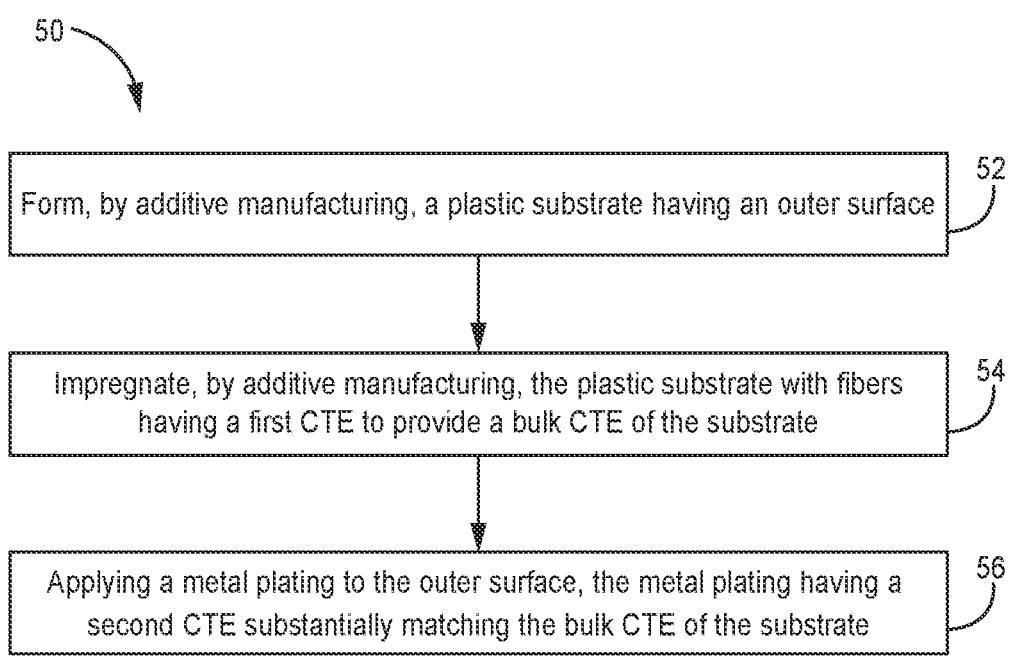
FIG. 3 is a flowchart of a method for forming a metal-plated component.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present disclosure is directed to metal-plated additively manufactured plastic aviation rotor components with controlled thermal expansion behavior to reduce component damage caused by operation in environments of varying temperature or temperature gradients.

FIG. 1 is a simplified cross-sectional view of a portion of a metal-plated plastic component. FIG. 1 shows component 10, substrate 12, matrix 14, fibers 16, outer surface 18, inner region 20, outer region 22, and metal plating 24. Component 10 can be a rotor component of a turbomachine, including but not limited to an impeller, compressor blade, or turbine blade. Substrate 12 has outer surface 18, inner region 20, and outer region 22. Outer region 22 is adjacent to outer surface 18. Inner region 20 is separated from outer surface 18 by outer region 22. Substrate 12 includes matrix 14 and fibers 16. Fibers 16 are embedded in matrix 14. Metal plating 24 is disposed on outer surface 18 of substrate 12.

Substrate 12 includes matrix 14 and fibers 16. Matrix 14 is a plastic or polymer material. Matrix 14 can be a thermoplastic. Matrix 14 can include but is not limited to acrylonitrile butadiene styrene (ABS), polyetherimide (PEI), thermoplastic polyimide, polyether ether ketone (PEEK), polyether ketone (PEKK), polysulfone, polyamide, polyphenylene sulfide, polyester, polyimide, and combinations thereof. Matrix 14 can define a shape of substrate 12. Matrix 14 can be formed of a plurality of materials with individual materials selectively located in substrate 12 to provide desired material properties in different regions of component 10. In some embodiments, substrate 12 can include one or more voids or open sections or structures, such as a hollow core or openings formed between internal support structures.

Fibers 16 are embedded in matrix 14. Fibers 16 are selected and arranged to control a bulk coefficient of thermal expansion (CTE) of substrate 12. Fibers 16 are selected and arranged in substrate 12 to reduce a CTE mismatch between substrate 12 and metal plating 24. Substrate 12 with fibers 16 can be designed to have a bulk CTE substantially matching a CTE of metal plating 24 to prevent separation of metal plating 24 from outer surface 18 during operation of component 10 in varying temperatures. Fibers 16 can be selected and arranged to meet additional functional requirements of component 10 including stress reduction, deflection management, and containment as described further herein.

Matrix 14 can be formed of a material having a CTE greater than the CTE of metal plating 24. Fibers 16 can be formed of material having a lower CTE than the CTE of matrix 14 to lower the bulk CTE of substrate 12. Fibers 16 constrain thermal expansion of substrate 12. Fibers 16 can include but are not limited to carbon, metal, para-aramid (e.g., Kevlar® and Twaron®), glass, and combinations thereof. In some embodiments, fibers 16 can be formed of the same material as metal plating 24. In some embodiments, subsets of fibers 16 can be formed of different materials. Regions of substrate 12 can include fibers 16 formed of the same material or different materials. The combinations of materials forming matrix 14 and fibers 16 can vary throughout a component to provide desired material properties.

Fibers 16 can be continuous fibers, discontinuous fibers, or combinations thereof. Fibers 16 can have a filament diameter and length selected to minimize cracking of substrate 12 caused by separation at fiber-matrix interfaces. A concentration and arrangement of fibers 16 can be selected to provide substrate 12 with a bulk CTE substantially matching the CTE of metal plating 24. As shown in FIG. 1, fibers 16 can be substantially uniformly distributed throughout matrix 14 to provide an entirety of substrate 12 with a bulk CTE substantially matching the CTE of metal plating 24. As discussed further herein, in some embodiments, fiber placement can be tailored to control a bulk CTE of one or more regions of substrate 12.

Fibers 16 can be disposed to extend parallel to outer surface 18 and metal plating 24 and/or perpendicular or otherwise angled relative to metal plating 24. Fibers 16 extending perpendicular to otherwise angled relative to metal plating 24 can extend through outer surface 18. Fibers 16 protruding through outer surface 18 can improve a bond between metal plating 24 and substrate 12. In some embodiments, a subset of fibers 16 can be disposed on or at outer surface 18. For example, fibers 16 can form a portion of outer surface 18 with individual fibers 16 separated by matrix 14. Fibers 16 disposed at outer surface 18 or protruding through outer surface 18 can be formed of a material capable of forming a high-strength bond with metal plating 24. Fibers 16 disposed at outer surface 18 or protruding through outer surface 18 can thereby improve a bond between metal plating 24 and substrate 12. For example, fibers 16 disposed at outer surface 18 or protruding through outer surface 18 can be formed of metal. In some embodiments, fibers 16 and metal plating 24 can be the same material. In some embodiments, a subset of fibers 16 formed of metal can be provided to improve bonding of metal plating 24, while bulk CTE of substrate 12 can be controlled primarily by a subset of fibers 16 formed of another material (e.g., carbon, para-aramid, or glass).

Selection of fiber 16 material, geometry, orientation relative to metal plating 24 or outer surface 18, and concentration can be made to provide substrate 12 with an expansion rate in outer region 22 in a plane parallel to metal plating 24 not exceeding the expansion rate of metal plating 24, while also improving a bond between substrate 12 and metal plating 24. While it is particularly important to control CTE mismatch between substrate 12 and metal plating 24 at the interface and an adjacent region to prevent separation of metal plating 24, it may not be necessary that all regions of substrate 12 have the same CTE as discussed further herein. In some embodiments, the composition of both fibers 16 and matrix 14 can vary from one region to another. The combination of materials can be selected to provide a desired bulk CTE and other material properties optimized for the operation of component 10. Metal plating 24 is disposed on outer surface 18. Metal plating can include but is not limited to chromium-nickel alloys or alloys containing at least one of nickel, cobalt, copper, iron, palladium, chromium, and cadmium. Metal plating 24 can be selected based on the operational environment of component 10 and performance requirements of component 10, including but not limited to operating temperatures, vibrational impacts, environmental contaminants, impact requirements, etc. Metal plating can have a thickness selected to achieve a desired strength of component 10 while minimizing the amount of weight metal plating 24 adds to substrate 12. Metal plating can have a thickness, for example, in a range of about 0.001 inches (0.0254 mm) to about 0.050 inches (1.27 mm). It may be desirable to provide metal plating 24 with a thickness outside of these ranges for some applications. Metal plating can be disposed directly on outer surface 18 of substrate 12. Metal plating 24 can cover all or portions of outer surface 18.

FIG. 2 is a simplified cross-sectional view of a portion of another embodiment of a metal-plated plastic component. FIG. 2 shows component 30, substrate 32, matrix 34, fibers 36, outer surface 38, inner region 40, outer region 42, and metal plating 44. Component 30 can be substantially similar to component 10 with the exception of the placement of fibers 36. Matrix 34 and metal plating 44 can be substantially the same as matrix 14 and metal plating 24 of component 10 shown in FIG. 1 and described with respect thereto. As described further herein, portions of matrix 34 can be provided with or without fibers 36. For example, some regions of substrate 32 can be formed of matrix 34 without fibers 36.

Fibers 36 are embedded in matrix 34. Fibers 36 are selected and arranged to control a bulk coefficient of thermal expansion (CTE) of substrate 32, particularly in outer region 42 and outer surface 38. Fibers 36 are selected and arranged in substrate 32 to reduce a CTE mismatch between substrate 32 and metal plating 44. Substrate 32 with fibers 36 can be designed to have a bulk CTE, particularly in outer region 42 and at outer surface 38, substantially matching a CTE of metal plating 44 to prevent separation of metal plating 44 from outer surface 38 during operation of component 30 in varying temperatures. As further described herein, fibers 36 can be selected and arranged to meet additional functional requirements of component 30 including stress reduction, deflection management, and containment as described further herein.

Fibers 36 can be arranged in a concentration gradient extending from inner region 40 to outer surface 38 with inner region 40 having a lower concentration of fibers 36 than outer region 42. Inner region 40 can be defined as a region internal to component 30 and/or separated from outer surface 38. Outer region 42 is disposed between inner region 40 and outer surface 38 and extending to outer surface 38. In some embodiments, all or a portion of inner region 40 can be free of fibers 36. The arrangement of fibers 36 in this manner (i.e., concentration gradient) can produce a variation in CTE of substrate 12 from inner region 40 through outer region 42, however, the variation in CTE can be tailored to minimize an impact at outer surface 38 or the bond between metal plating 44 and substrate 32.

Fibers 36 can include but are not limited to carbon, metal, para-aramid (e.g., Kevlar® and Twaron®), glass, and combinations thereof. In some embodiments, fibers 36 can be formed of the same material as metal plating 44. In some embodiments, subsets of fibers 36 can be formed of different materials. Regions of substrate 32 can include fibers 36 formed of the same material or different materials. The combinations of materials forming matrix 14 and fiber 16 can vary throughout a component to provide desired material properties.

Fibers 36 can be continuous fibers, discontinuous fibers, or combinations thereof. Fibers 36 can have a filament diameter and length selected to minimize cracking of substrate 32 caused by separation at fiber-matrix interfaces. A concentration and arrangement of fibers 36 across inner region 40 and/or outer region 42 can be selected to provide substrate 32 with a bulk CTE at and adjacent to outer surface 38 substantially matching the CTE of metal plating 44. As shown in FIG. 2, fibers 36 can be provided in greatest concentration adjacent to outer surface 38.

As described with respect to FIG. 1, fibers 36 can be disposed to extend parallel and/or perpendicular or otherwise angled relative to outer surface 38 and metal plating 44. Fibers 36 extending perpendicular to otherwise angled relative to metal plating 44 can extend through outer surface 38. Fibers 36 protruding through outer surface 38 can improve a bond between metal plating 44 and substrate 32. In some embodiments, fibers 36 can be disposed on or at outer surface 38. For example, fibers 36 can form a portion of outer surface 38 with individual fibers 36 separated by matrix 34. Fibers 36 disposed at outer surface 38 or protruding through outer surface 38 can be formed of a material capable of forming a high-strength bond with metal plating 44. Fibers 36 disposed at outer surface 38 or protruding through outer surface 38 can thereby improve a bond between metal plating 44 and substrate 32. For example, fibers 36 disposed at outer surface 38 or protruding through outer surface 38 can be formed of metal. In some embodiments, fibers 36 and metal plating 44 can be the same material. A subset of fibers 36 formed of metal can be provided to improve bonding of metal plating 44, while bulk CTE of substrate 32 can be controlled primarily by a subset of fibers 36 formed of another material (e.g., carbon, para-aramid, or glass).

Selection of fiber 36 material, geometry, orientation relative to metal plating 44 or outer surface 38, and concentration can be made to provide substrate 32 with an expansion rate in outer region 42 in a plane parallel to metal plating 44 not exceeding the expansion rate of metal plating 44, while also improving a bond between substrate 32 and metal plating 44.

FIG. 3 is a flowchart of a method forming a metal-plated component according to the present disclosure. FIG. 3 shows method 50. Step 52 includes forming, by an additive manufacturing process, a plastic substrate (e.g., substrate 12 or 32) having an outer surface. The substrate can be formed by 3D plastic printing by depositing a matrix material, such as matrix materials 14 and 34 shown in FIGS. 1 and 2 and described with respect thereto.

Step 54 includes impregnating, by the additive manufacturing process, the substrate with fibers. Fibers can be fibers 16 and 36 shown in FIGS. 1 and 2 and described with respect thereto. As previously described, the fibers can be selected and arranged to provide desired material properties. Fibers can be co-extruded with the matrix material to form the substrate with fibers embedded in the matrix. The addition of fibers to the matrix material produces a substrate with a bulk CTE less than a CTE of the matrix material.

In some embodiments, fibers can be arranged in concentration and/or material gradients as previously described. Fiber arrangement can be controlled by the 3D printing process. In some embodiments, a dual nozzle can be used to extrude materials of different fiber compositions and/or fiber concentrations and selectively print the different material in different regions of the substrate. For example, step 54 can include selectively printing the fibers in a concentration gradient extending from an inner region of the plastic substrate to the outer surface of the plastic substrate, such that the concentration of fibers increases from the inner region toward the outer surface of the plastic substrate. In other embodiments, step 54 can include selectively printing the fibers in a region adjacent to the outer surface of the plastic substrate and/or at an angle relative to the outer surface and/or such that fibers protrude through the outer surface of the plastic substrate to improve bonding with a metal plating applied on the outer surface. In some embodiments, step 54 can include selectively printing the plastic substrate without the fibers (e.g., matrix material only) in an inner region of the plastic substrate.

Step 56 includes applying a metal plating to the outer surface of the substrate. Metal plating can be metal plating 24 and 44 shown in FIGS. 1 and 2 and described with respect thereto. The metal plating can be selectively applied to one or more locations on the outer surface (e.g., locations susceptible to damage by abrasion, etc.). The metal plating has a CTE substantially matching the bulk CTE of the substrate or bulk CTE of the substrate in a region adjacent to the outer surface of the substrate in the location metal plating is to be applied. The metal plating can be applied, for example by electroless plating. In some examples, a printer with a dual nozzle can be used to selectively print a catalyst material layer on all or portions of an outer surface of the substrate. For example, one nozzle can extrude the substrate material (matrix and fiber) and one nozzle can extrude the matrix material loaded with a catalyst. The metal plating can then be formed on the outer surface loaded with the catalyst through a process of electroless plating.

Figure 4:
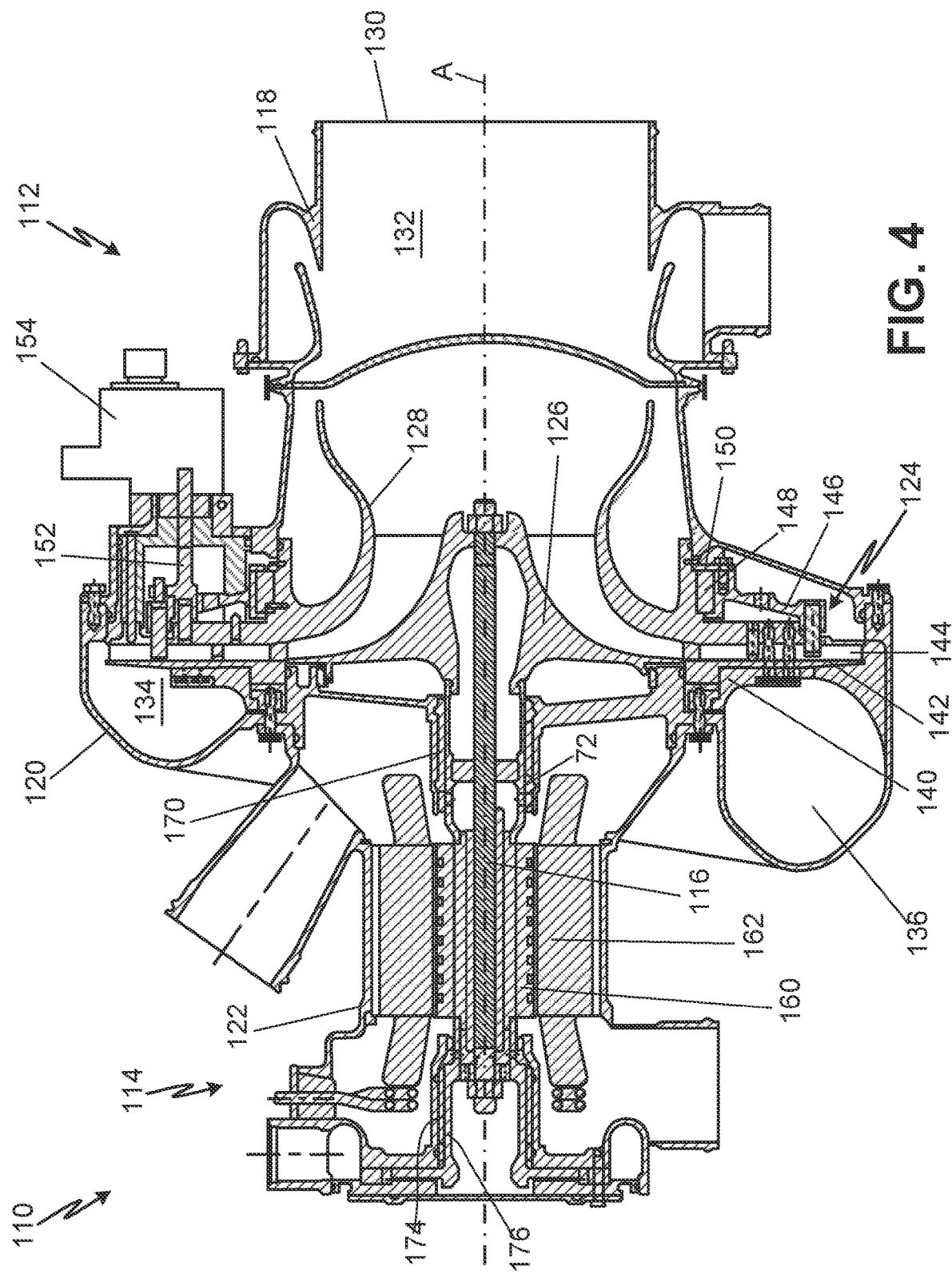
FIG. 4 is a cross-sectional view of a turbomachine.
Figure 5:
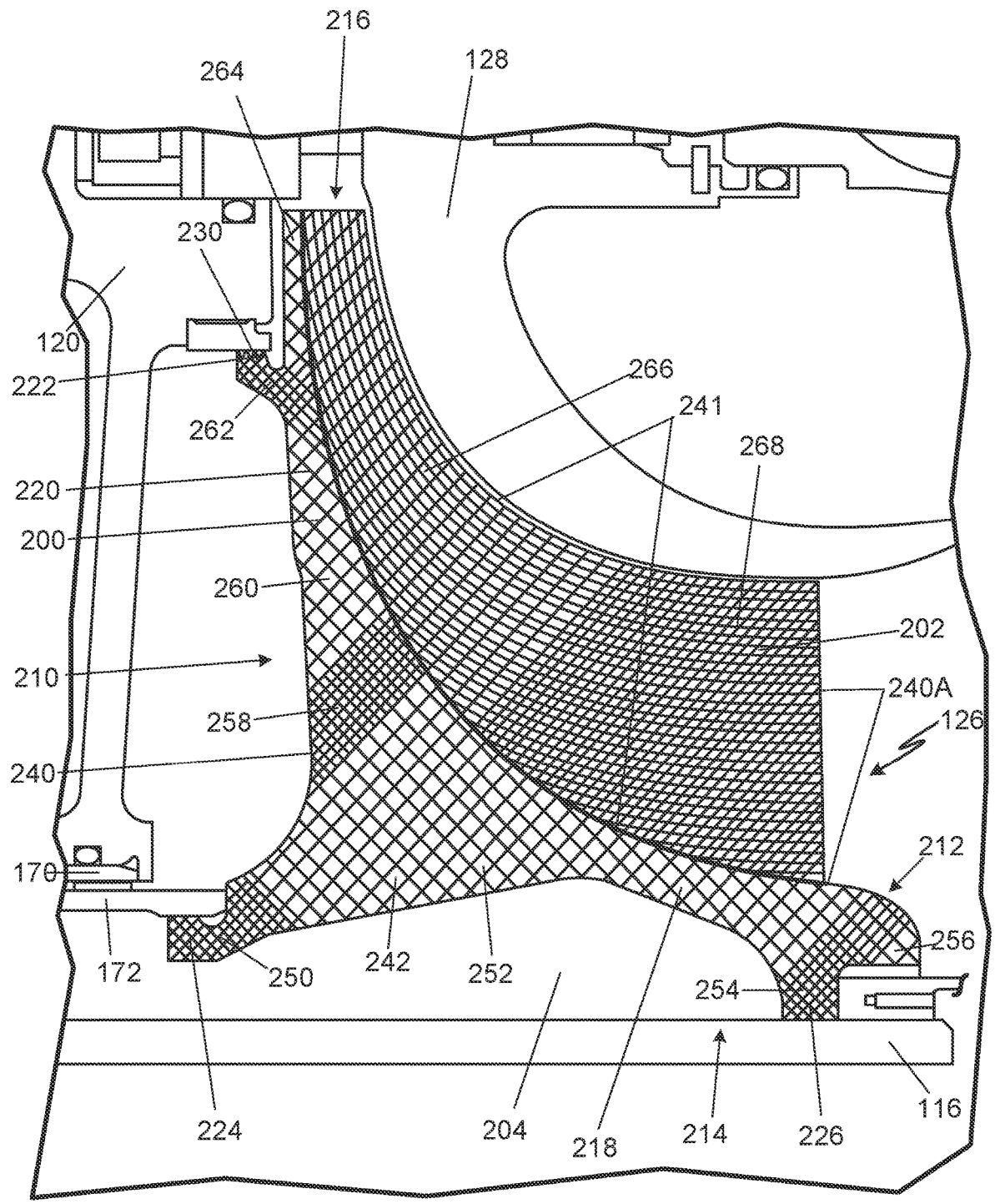
FIG. 5 is a cross-sectional view of a rotor of the turbomachine of FIG. 4.

FIG. 4 is a cross-sectional view of a turbomachine. FIG. 5 is a cross-sectional view of a metal-plated plastic rotor of the turbomachine of FIG. 4 formed according to the methods disclosed herein. FIGS. 4 and 5 are discussed together herein.

FIG. 4 shows turbomachine 110. Turbomachine 110 can be a cabin air compressor. Turbomachine 110 includes compressor section 112, motor section 114, tie rod 116, compressor inlet housing 118, compressor outlet housing 120, motor housing 122, variable diffuser 124, rotor 126, and rotor shroud 128. Compressor inlet housing 118 includes inlet 130 and inlet duct 132. Compressor outlet housing 120 includes outlet duct 134 and outlet 136. Variable diffuser 116 includes backing plate 140, inboard plate 142, diffuser vanes 144, drive ring 146, drive ring bearing 148, backup ring 150, pinion 152, and variable diffuser actuator 154. Motor section 114 includes motor rotor 160 and motor stator 162. Turbomachine 110 further includes first journal bearing 170, first rotating shaft 172, second journal bearing 174, and second rotating shaft 176. FIG. 4 also shows axis A.

Turbomachine 110 includes compressor section 112 and motor section 114 mounted on tie rod 116. Tie rod 116 is configured to rotate about axis A. Compressor section 112 includes compressor inlet housing 118 and compressor outlet housing 120 that are connected to one another. Motor section 114 includes motor housing 122, which is connected to compressor outlet housing 120. Variable diffuser 124 is positioned between compressor inlet housing 118 and compressor outlet housing 120. Rotor 126 is positioned between compressor inlet housing 118 and compressor outlet housing 120. Rotor 126 is mounted on tie rod 116, which rotatably connects rotor 126 and motor section 114. Rotor shroud 128 is positioned radially outward from and partially surrounds compressor rotor 126.

Compressor inlet housing 118 includes inlet 130 and inlet duct 132. Inlet 130 is positioned at a first end of compressor inlet housing 118. Inlet duct 132 extends from inlet 130 through compressor inlet housing 118 to rotor 126. Compressor outlet housing 120 includes outlet duct 134 and outlet 136. Outlet duct 134 extends through compressor outlet housing 120 from rotor 126 to outlet 136.

Variable diffuser 116 includes backing plate 140, inboard plate 142, diffuser vanes 144, drive ring 146, drive ring bearing 148, pinion 150, backup ring 152, and variable diffuser actuator 154. Backing plate 140 abuts compressor outlet housing 120 on a first side and inboard plate 142 on a second side. Inboard plate 142 abuts backing plate 140 on a first side and diffuser vanes 144 on a second side. Diffuser vanes 144 abut inboard plate 142 on a first side and rotor shroud 128 on a second side. Diffuser vanes 144 are configured to direct the compressed air from rotor 126 into outlet duct 134. Drive ring 146 is positioned radially outward from rotor shroud 128, and drive ring bearing 148 is positioned between driver ring 146 and rotor shroud 128. Drive ring 146 abuts rotor shroud 128 on a first side and backup ring 150 on a second side. Backup ring 150 is positioned radially outward of rotor shroud 128. Pinion 152 is connected to variable diffuser actuator 154 and is coupled to drive ring 146. Pinion 152 permits control of variable diffuser 116. Drive ring 146 is coupled to diffuser vanes 144 with pins, and as drive ring 146 is rotated it will drag diffuser vanes 144 and cause them to rotate.

Motor section 114 includes motor housing 122, motor rotor 160, and motor stator 162. Motor housing 122 surrounds motor rotor 160 and motor stator 162. Motor rotor 160 is disposed within motor stator 162 and is configured to rotate about axis A. Motor rotor 160 is mounted to tie rod 116 to drive rotation of tie rod 116.

Motor rotor 160 of motor section 114 drives rotation of shafts in turbomachine 110, which in turn rotate rotor 126. The rotation of rotor 126 draws air into inlet 130 of compressor inlet housing 118. The air flows through inlet duct 132 to rotor 126 and will be compressed by rotor 126. The compressed air is then routed through variable diffuser 116 and into outlet duct 134 of compressor outlet housing 120. The air then exits turbomachine 110 through outlet 136 of compressor outlet housing 120 and can be routed to another component of an environmental control system, such as an air cycle machine.

Turbomachine 110 further includes first journal bearing 170, first rotating shaft 172, second journal bearing 174, and second rotating shaft 176. First journal bearing 170 is positioned in compressor section 112 and is supported by compressor outlet housing 120. First rotating shaft 172 extends between and rotates with rotor 126 and motor rotor 160. Motor rotor 160 drives rotation of rotor 126 with first rotating shaft 172. A radially outer surface of first rotating shaft 172 abuts a radially inner surface of first journal bearing 170. Second journal bearing 174 is positioned in motor section 114 and is supported by motor housing 122. Second rotating shaft 176 extends from and rotates with motor rotor 160. A radially outer surface of second rotating shaft 176 abuts a radially inner surface of second journal bearing 174.

FIG. 5 is a cross-sectional view of rotor 126 positioned in cabin air compressor 110. FIG. 5 shows tie rod 116, compressor outlet housing 120, rotor 126, rotor shroud 128, first journal bearing 170, and first rotating shaft 172 of cabin air compressor 110. Rotor 126 includes hub 200, blades 202, and bore 204. Hub 200 includes first side 210, second side 212, radially inner end 214, radially outer end 216, shaft portion 218, disk portion 220, first flange 222, second flange 224, and third flange 226. As shown in FIG. 5, rotor 126 further includes outer surface 240, metal plating 241, and fiber-reinforced plastic structure 242. Outer surface 240 is a solid, continuous surface. Outer surface 240 includes outer surface 240A configured to be disposed in a gas path during operation of rotor 126. Outer surface 240A can include metal plating 241. A fiber density of the fibers embedded in the matrix material can vary within the substrate. Fiber-reinforced plastic structure 242 can include regions of varying fiber density, including first region 250, second region 252, third region 254, fourth region 256, fifth region 258, sixth region 260, seventh region 262, and eighth region 264 in hub 200, and ninth region 266 and tenth region 268 in blades 202. Fiber material and arrangement (e.g., orientation and density) can be selected as previously described to control the bulk CTE of fiber-reinforced plastic structure 242 and, particularly a CTE of fiber-reinforced plastic structure 242 in locations of rotor 128 adjacent to locations where metal plating 241 is provided to improve a bond between fiber-reinforced plastic structure 242 and metal plating 241. Additionally, fiber density can be increased in regions subject to deflection or increased stress during rotation of rotor 126 to aid in deflection management and stress reduction. The disclosed regions of varying fiber density are illustrated by lines of varying orientation and spacing. Regions having more closely spaced lines represent regions of higher density. The lines do not indicate an orientation or arrangement of fibers. The disclosed regions of varying density are approximate locations. It will be understood by one of ordinary skill in the art that the density of fibers in any region of rotor 126 can be based on operating conditions (e.g., speed and temperature) of rotor 126 in its environment.

Cabin air compressor 110 has the structure and design as described above in reference to FIG. 4. Rotor 126 is mounted on tie rod 116. First flange 222 of hub 200 of rotor 126 forms a labyrinth seal that seals against compressor outlet housing 120. As rotor 126 rotates with tie rod 116, the labyrinth seal on first flange 222 will rotate against compressor outlet housing 120, which is a stationary component of cabin air compressor 110. Second flange 224 of hub 100 of rotor 126 abuts and rotates with first rotating shaft 172. Third flange 226 of hub 200 of rotor 126 abuts and rotates with tie rod 116. Third flange 226 of hub 200 mounts rotor 126 to tie rod 116. Rotor shroud 128 is positioned radially outward from rotor 126 and partially surrounds rotor 126.

Rotor 126 is a metal-plated plastic component formed according to the present disclosure and including a fiber-reinforced matrix (also referred to as "fiber-reinforced plastic structure 242") as disclosed in FIGS. 1 and 2 and variations thereof. Fibers can be selected and arranged to control thermal expansion of the plastic component relative to metal plating 241 and a bulk thermal expansion coefficient of rotor 126 to manage deflection of rotor 126 during operation. Fibers can be arranged in increasing fiber density in one or more regions of rotor 126 to restrain growth of rotor 126 due to increased temperature during operation. Furthermore, localized increase in fiber density can increase stiffness of rotor 126, which can minimize deflection of rotor 126. Furthermore, localized increased fiber density can restrain rotor 126. Metal plating 241 can be disposed on one or more portions of rotor 126. Metal plating 241 can provide added strength and improved abrasion resistance of rotor 126. Metal plating 241 can be provided in locations of rotor 126 most susceptible to abrasion including outer surface 240A and seal 228. In some embodiments, application of metal plating 241 can be limited to regions susceptible to damage, such as outer surface 240A and seal 228 to reduce the weight of rotor 126. A thickness of metal plating 241 can vary based on operational requirements of rotor 128.

Hub 200 has seventh region 262 of fiber-reinforced plastic structure 242 in first flange 222 and extending into disk portion 220 of hub 200. Seventh region 262 is a deflection region of hub 200, which is a region of hub 200 that is subject to deflection during operation of rotor 126. As rotor 126 rotates with tie rod 116, first flange 222 will rotate against compressor outlet housing 120 and subject seventh region 262 to deflection. Seventh region 262 of fiber-reinforced 242 includes fibers selected and arranged to aid in deflection management during operation of rotor 126 to reduce and prevent deflection of rotor 126. By reducing and preventing deflection during operation of rotor 126, the efficiency of cabin air compressor 110 can be increased. The density of fibers can be increased in seventh region 262 to control deflection.

Hub 100 has fifth region 258 of fiber-reinforced plastic structure 242 in disk portion 220 near shaft portion 218. Fifth region 258 is a deflection region of hub 200, which is a region of hub 200 that is subject to deflection during operation of rotor 126. As rotor 126 rotates with tie rod 116, fifth region 258 will be subjected to deflection. Fifth region 258 of fiber-reinforced 242 includes fibers selected and arranged to aid in deflection management during operation of rotor 126 to reduce and prevent deflection of rotor 126. By reducing and preventing deflection during operation of rotor 126, the efficiency of cabin air compressor 110 can be increased. The density of fibers can be increased in fifth region 258 to control deflection.

Blades 202 have ninth region 266 and tenth region 268 of fiber-reinforced plastic structure 242. Ninth region 266 is a region of fiber-reinforced plastic structure 242 in a portion of blade 202 extending along disk portion 220 of hub 200. Tenth region 268 is a region of fiber-reinforced plastic structure 242 in a portion of blade 202 extending along shaft portion 218 of hub 200. Ninth region 266 and tenth region 268 are deflection regions of rotor 126, which are regions of rotor 126 that are subject to deflection during operation of rotor 126. Ninth region 266 and tenth region 268 both have increased fiber density compared to second region 252, fourth region 256, sixth region 260, and eighth region 264. Blades 202 are subject to deflection during operation of rotor 126 and thus have an increase density to prevent deflection of blades 202. Tenth region 268 can also have an increased fiber density compared to ninth region 266. Tenth region 268 is a region of blades 202 that forms the tips of blades 202 that are subject to higher deflection. Tenth region 268 can have a greater fiber density to prevent deflection in the tips of blades 202.

There is a gap between blades 202 of rotor 126 and rotor shroud 128 to prevent contact between blades 202 of rotor 126 and rotor shroud 128. Contact between blades 202 and rotor shroud 128 may damage both components and cause failure of cabin air compressor 110. The gap between blades 202 and rotor shroud 128 has to account for deflection that hub 200 and blades 202 of rotor 126 can be subjected to during operation of rotor 126. Thus, the more deformation that hub 200 and blades 202 are subjected to during operation of rotor 126, the larger the gap needs to be to ensure component safety. However, air can leak from cabin air compressor 110 through the gap, which leads to inefficiencies in cabin air compressor 110. Thus, it is desirable to minimize the gap between blades 202 of rotor 126 and rotor shroud 128. Identifying deflection regions of hub 200 and blades 202 and increasing the fiber density in fiber-reinforced plastic structure 242 in the deflection regions (for example, fifth region 258, seventh region 262, ninth region 266, and tenth region 268) reduces and prevents the deflections and strain that hub 200 and blades 202 are subjected to during operation of rotor 126 by controlling thermal growth and increasing the stiffness in these areas. This reduced deflection and strain and increased stiffness means that the parts deform less when in operation. If hub 200 and blades 202 undergo less deflection, the gap between blades 202 of rotor 126 and rotor shroud 128 can be reduced. Reducing the gap increases the efficiency of cabin air compressor 110, as more air is forced through rotor 126 and into variable diffuser 124.

Hub 200 has first region 250 of fiber-reinforced plastic structure 242 in second flange 224 and extending into shaft portion 218. First region 250 is a stress region of hub 200, which is a region of hub 200 that is subject to high stress during operation of rotor 126. The high stress in stress regions of rotor 126, such as first region 250, is a higher stress than stresses present in other regions of rotor 126. As rotor 126 rotates with tie rod 216, second flange 224 will rotate with first rotating shaft 172 and subject first region 250 to high stress. First region 250 of fiber-reinforced plastic structure 242 is an area of increased fiber density that aids in stress reduction during operation of rotor 126 to reduce the stress in first region 250 of hub 200. Stress reduction at critical points of hub 200 leads to increased longevity of rotor 126.

Hub 200 has third region 254 of lattice structure 242 in third flange 226 and extending into shaft portion 218. Third region 254 is a stress region of hub 200, which is a region of hub 200 that is subject to high stress during operation of rotor 126. The high stress in stress regions of rotor 126, such as third region 254, is a higher stress than stresses present in other regions of rotor 126. As rotor 126 rotates with tie rod 216, third flange 226 will rotate with tie rod 216 and subject third region 254 to high stress. Third region 254 of fiber-reinforced plastic structure 242 is an area of increased fiber density that aids in stress reduction during operation of rotor 126 to reduce the stress in third region 254 of hub 200. Stress reduction at critical points of hub 200 leads to increased longevity of rotor 126.

Reducing stress in stress regions of rotor 126 will also improve the longevity of rotor 126. Reducing the stresses at stress regions can reduce the failure rate of rotor 126 as well as the failure rate of cabin air compressor 110 overall. During operation, these failures can be damage components surrounding rotor 126, such as rotor shroud 128, as these components are required to contain the energy of the failure for safety of the aircraft and its passengers. Reduced failure rates result in reduced down time, reduced repairs, and reduced costs.

Traditional rotors for rotary machines have solid cross-sections and are manufactured by forging and/or subtractive manufacturing processes, such as hogout. Additively manufacturing can be used to produce fiber-reinforced metal-plated plastic rotor 126 having a reduced weight compared to traditional rotors while providing abrasion resistance, deflection control, and stress reduction.

Rotor 126 is one example of a metal plated fiber-reinforced plastic rotor. In alternate embodiments, variations of the disclosed metal-plated fiber-reinforced plastic structure 242 can be used in any suitable rotor, for example a turbine rotor, having any design. Further, cabin air compressor 110 is one example of a turbomachinery or rotary machine in which rotor 126 or any other rotor with metal plated fiber-reinforced plastic structure 242 or variations thereof can be used.

The disclosed metal-plated plastic rotor components with controlled thermal expansion behavior have an increased durability in environments of varying temperature or temperature gradients. Additional benefits of the disclosed metal-plated components include reduced weight, reduced costs, and faster design, manufacturing, and testing time. Additionally, plastic parts are not prone to static electric charging.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A rotor for a turbomachine includes a hub centered on a central axis and having a disk portion and a shaft portion and a blade extending outward from the hub. The hub and the blade together include a plastic substrate and metal plating disposed on at least apportion of an outer surface of the plastic substrate. The plastic substrate has a matrix material and fibers embedded in the matrix material. The fibers have a first coefficient of thermal expansion. The metal plating has a second coefficient of thermal expansion. The fibers are selected such that a bulk coefficient of thermal expansion of the plastic substrate at the outer surface of the plastic substrate substantially matches the second coefficient of thermal expansion of the metal plating.

The rotor of the preceding paragraph can optionally include, additionally and/or alternatively, any one or more of the following features, configurations and/or additional components:

In an embodiment of the rotor of the preceding paragraph the matrix material can have a third coefficient of thermal expansion, the third coefficient of thermal expansion greater than the first coefficient of thermal expansion of the fibers.

In an embodiment of the rotor of any of the preceding paragraphs, the first coefficient of thermal expansion of the fibers can be less than the second coefficient of thermal expansion of the metal plating.

In an embodiment of the rotor of any of the preceding paragraphs, the fibers can be selected from the group consisting of carbon, para-aramid, glass, metal, and combinations thereof.

In an embodiment of the rotor of any of the preceding paragraphs, the metal plating and the fibers can be the same material.

In an embodiment of the rotor of any of the preceding paragraphs, a fiber density of the fibers embedded in the matrix material varies within the plastic substrate.

In an embodiment of the rotor of any of the preceding paragraphs, the plastic substrate can include a first region having a reduced fiber density and one or more second regions having an increased fiber density. The one or more second regions can be a deflection region or a stress region of the rotor. The deflection region is subject to deflections during operation of the turbomachine and the stress region adapted to withstand higher stress than other regions of the rotor during operation of the turbomachine.

In an embodiment of the rotor of any of the preceding paragraphs, the stress region can be a flange extending radially inward from the shaft portion of the hub.

In an embodiment of the rotor of any of the preceding paragraphs, the deflection region can be a flange extending axially outward form the disk portion of the hub.

In an embodiment of the rotor of any of the preceding paragraphs, the deflection region can be in the blade.

In an embodiment of the rotor of any of the preceding paragraphs, the plastic substrate can include an outer region disposed adjacent to the metal coating, the outer region having an increased fiber density.

In an embodiment of the rotor of any of the preceding paragraphs, fibers of the outer region can protrude through the outer surface of the plastic substrate.

In an embodiment of the rotor of any of the preceding paragraphs, fibers of the outer region can be angled with respect to the outer surface of the plastic substrate.

A method of forming a rotor for a turbomachine includes forming, by an additive manufacturing process, a plastic substrate having an outer surface, impregnating, by the additive manufacturing process, the plastic substrate with fibers having a first coefficient of thermal expansion, and applying a metal plating to the outer surface of the plastic substrate. The metal plating has a second coefficient of thermal expansion and the fibers are selected such that a bulk coefficient of thermal expansion of the plastic substrate at the outer surface of the plastic substrate substantially matches the second coefficient of thermal expansion of the metal plating.

The method of the preceding paragraph can optionally include, additionally and/or alternatively, any one or more of the following features, configurations, additional components, and/or steps:

In an embodiment of the method of the preceding paragraph, the additive manufacturing process can be 3D printing.

In an embodiment of the method of any of the preceding paragraphs, the step of impregnating can include selectively printing the fibers to form a region of increased fiber density adjacent to the portion of the outer surface of the plastic substrate to which the metal plating is applied.

In an embodiment of the method of any of the preceding paragraphs, the step of impregnating can include selectively printing fibers at an angle relative to the portion of the outer surface to which the metal plating is applied.

In an embodiment of the method of any of the preceding paragraphs, the plastic of the plastic substrate can have a third coefficient of thermal expansion, the third coefficient of thermal expansion greater than the first coefficient of thermal expansion of the fibers.

In an embodiment of the method of any of the preceding paragraphs, the first coefficient of thermal expansion of the fibers can be less than the second coefficient of thermal expansion of the metal plating.

In an embodiment of the method of any of the preceding paragraphs, the fibers can be selected from the group consisting of carbon, para-aramid, glass, metal, and combinations thereof.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A rotor for a turbomachine, the rotor comprising:
   a hub centered on a central axis and having a disk portion and a shaft portion; and
   a blade extending outward from the hub, the hub and the blade together comprising:
      a plastic substrate, the plastic substrate comprising:
         a matrix material; and
         fibers embedded in the matrix material, the fibers having a first coefficient of thermal expansion wherein a fiber density of the fibers embedded in the matrix material varies within the plastic substrate; and
      a metal plating disposed on at least a portion of an outer surface of the plastic substrate, the metal plating having a second coefficient of thermal expansion,
      wherein the fibers are selected such that a bulk coefficient of thermal expansion of the plastic substrate at the outer surface of the plastic substrate substantially matches the second coefficient of thermal expansion of the metal plating; and
      wherein the plastic substrate comprises an outer region disposed adjacent to the metal plating, the outer region having an increased fiber density.

2. The rotor of claim 1, wherein the matrix material has a third coefficient of thermal expansion, the third coefficient of thermal expansion greater than the first coefficient of thermal expansion of the fibers.

3. The rotor of claim 2, wherein the first coefficient of thermal expansion of the fibers is less than the second coefficient of thermal expansion of the metal plating.

4. The rotor of claim 1, wherein the fibers are selected from the group consisting of carbon, para-aramid, glass, metal, and combinations thereof.

5. The rotor of claim 4, wherein the metal plating and the fibers are the same material.

6. The rotor of claim 1, wherein the plastic substrate comprises:
   a first region having a reduced fiber density; and
   one or more second regions having an increased fiber density;
   wherein the one or more second regions is a deflection region or a stress region of the rotor, the deflection region subject to deflections during operation of the turbomachine and the stress region adapted to withstand higher stress than other regions of the rotor during operation of the turbomachine.

7. The rotor of claim 6, wherein the stress region is a flange extending radially inward from the shaft portion of the hub.

8. The rotor of claim 6, wherein the deflection region is a flange extending axially outward from the disk portion of the hub.

9. The rotor of claim 6, wherein the deflection region is in the blade.

10. The rotor of claim 1, wherein fibers of the outer region protrude through the outer surface of the plastic substrate.

11. The rotor of claim 1, wherein fibers of the outer regions are angled with respect to the outer surface of the plastic substrate.

12. A method of forming a rotor for a turbomachine, the method comprising:
    forming, by an additive manufacturing process, a plastic substrate comprising a matrix material and having an outer surface;
    embedding, by the additive manufacturing process, the matrix material of the plastic substrate with fibers having a first coefficient of thermal expansion; and
    applying a metal plating to at least a portion of the outer surface of the plastic substrate, the metal plating having a second coefficient of thermal expansion;
    wherein the fibers are selected such that a bulk coefficient of thermal expansion of the plastic substrate at the outer surface of the plastic substrate substantially matches the second coefficient of thermal expansion of the metal plating;
    wherein the plastic substrate and the metal plating together form the rotor having a hub centered on a central axis and having a disk portion and a shaft portion and a blade extending outward from the hub;
    wherein the step of embedding comprises selectively printing fibers to vary a fiber density in the plastic substrate and to form a region of increased fiber density adjacent to the portion of the outer surface of the plastic substrate to which the metal plating is applied.

13. The method of claim 12, wherein the additive manufacturing process is 3D printing.

14. The method of claim 12, wherein the step of embedding further comprises
    selectively printing fibers at an angle relative to the portion of the outer surface to which the metal plating is applied.

15. The method of claim 12, wherein the plastic of the plastic substrate has third coefficient of thermal expansion, the third coefficient of thermal expansion greater than the first coefficient of thermal expansion of the fibers.

16. The method of claim 15, wherein the first coefficient of thermal expansion of the fibers is less than the second coefficient of thermal expansion of the metal plating.

17. The method of claim 16, wherein the fibers are selected from the group consisting of carbon, para-aramid, glass, metal, and combinations thereof.

* * * * *